United States Patent [19]

Kelch et al.

[11] Patent Number: 5,254,401
[45] Date of Patent: Oct. 19, 1993

[54] PACKAGING MATERIAL FOR CONTROLLED ATMOSPHERE PACKAGING

[75] Inventors: Robert H. Kelch, Granville; Vincent S. Zabrocki, Newark, both of Ohio

[73] Assignee: The Dow Chemical Company, Midland, Mich.

[21] Appl. No.: 619,574

[22] Filed: Nov. 29, 1990

[51] Int. Cl.⁵ .................... B32B 5/18; B32B 7/12; B65D 85/50
[52] U.S. Cl. .................. 428/317.1; 428/317.5; 428/317.7; 428/319.7; 428/507; 428/511; 426/127
[58] Field of Search ............... 428/317.1, 317.3, 317.5, 428/35.5, 319.7, 317.7, 507, 511; 426/127, 415, 419

[56] References Cited

U.S. PATENT DOCUMENTS

| Re. 31,856 | 3/1985 | Pannenbecker et al. | 156/244.14 |
| 3,411,967 | 11/1968 | Rowland et al. | 428/317.5 |
| 4,045,270 | 8/1977 | Jofs | 156/229 |
| 4,085,175 | 4/1978 | Keuchel | 264/51 |
| 4,264,386 | 4/1981 | Sears, Jr. et al. | 156/79 |
| 4,264,659 | 4/1981 | Pattenden | 428/317.5 |
| 4,488,918 | 12/1984 | Jofs | 156/79 |

Primary Examiner—George F. Lesmes
Assistant Examiner—Christopher Brown

[57] ABSTRACT

A packaging material useful for the controlled atmosphere packaging in bulk of fresh produce, comprising a liner material and a supporting cardboard substrate, wherein the liner material comprises an open cell foamed adhesive portion and a substantially solid thermoplastic film portion in face-to-face relationship.

3 Claims, 1 Drawing Sheet

PACKAGING MATERIAL FOR CONTROLLED ATMOSPHERE PACKAGING

BACKGROUND OF THE INVENTION

The present invention relates generally to packaging and the materials used therein, and more particularly to the materials used in the packaging in bulk of perishable goods such as fresh produce.

Most of the truly ripe produce one buys fresh from a market is locally produced, packaged in materials such as cardboard which are comparatively inexpensive, and shipped to market in bulk via some means of refrigerated transport to retard ripening and minimize spoilage from farm to market. Refrigeration alone is not adequate, however, to enable the harvesting of fully ripened produce at more remote locations, and the shipping and marketing of the produce from such locations to take advantage of economies of scale in produce source procurement, processing, packaging and the like.

Some attempts have been made at developing packaging which would enable the harvesting of fully ripened produce at these more remote locations, and the achievement of the above-mentioned economies of scale. See, e.g., U.S. Pat. No. 4,883,674 to Fan. This packaging, commonly described in the art as "controlled atmosphere packaging," heretofore has been directed only to the packaging of relatively small amounts of produce.

Because produce is desirably and predominantly shipped in bulk quantities, though, there is a significant need for a controlled atmosphere packaging material which is economical and effective for such bulk quantities, and which provides an additional impediment to spoilage over and above that commonly provided by refrigeration. It would further be advantageous if such a material makes use in some fashion of the cardboard cartons to which growers, packagers, distributors, and retailers have become accustomed.

SUMMARY OF THE INVENTION

The present invention meets these needs by providing a packaging material for the controlled atmosphere packaging of perishable items such as fresh produce, especially at refrigeration temperatures and conditions. The packaging material of the present invention comprises a liner material and a supporting substrate, wherein the liner material broadly comprises an open cell foamed adhesive portion and a substantially solid thermoplastic film portion in face-to-face relationship.

DETAILED DESCRIPTION OF THE PREFERRED EMBODIMENT

Figure 1:
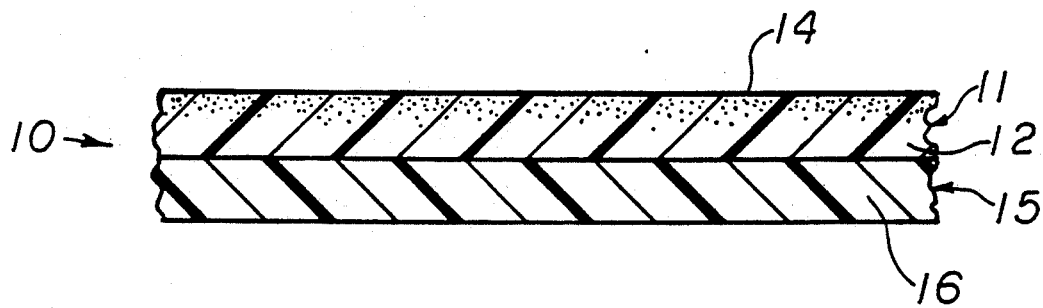
FIG. 1 is a fragmentary cross-sectional view of a liner material of the present invention.

Referring now to the drawings, and more particularly to FIG. 1, a liner material of the present invention is shown and generally designated by the numeral 10.

In a preferred embodiment shown in FIG. 1 the open cell foamed adhesive portion 11 consists essentially of a single open cell foamed adhesive layer 12 which defines a first outer face 14 of the structure 10. The substantially solid thermoplastic film portion 15 consists essentially of one or more substantially solid thermoplastic film layers 16, and for simplicity of construction and design most preferably consists essentially of a single such layer 16.

Figure 2:
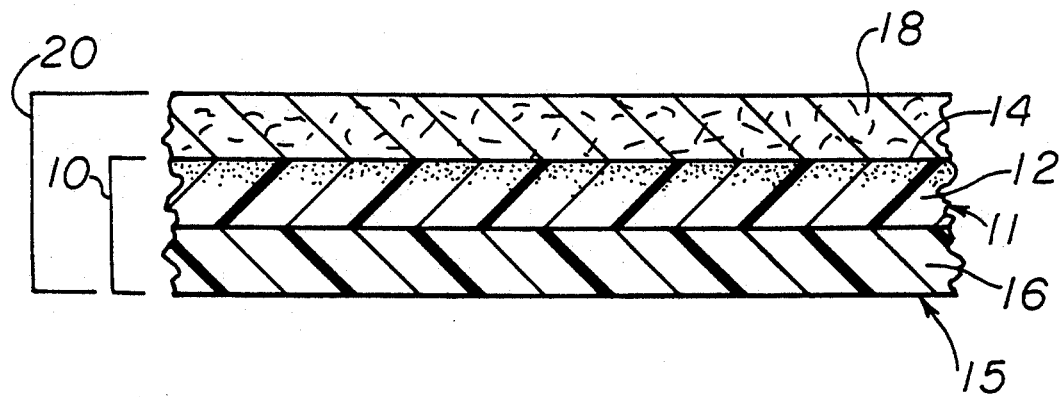
FIG. 2 is a fragmentary cross-sectional view of a packaging material of the present invention, including a supporting substrate and the liner material of FIG. 1.
Figure 3:
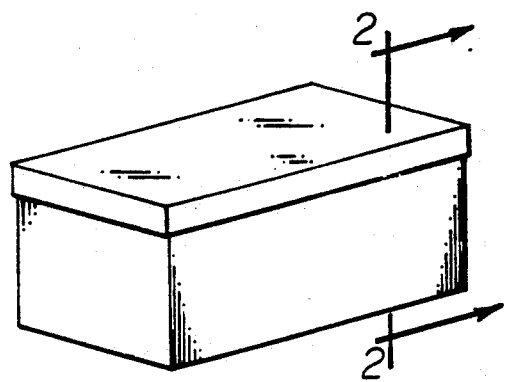
FIG. 3 depicts a controlled atmosphere package formed from the packaging material of FIG. 2.

The liner material 10 is joined to a supporting substrate 18 to form a controlled atmosphere packaging material 20, as seen in FIG. 2. The substrate 18 is present primarily for providing structural integrity and strength to a controlled atmosphere package made from the material 20 (FIG. 3), and is preferably cardboard or a similar common and inexpensive material which is currently employed for the bulk packaging of fresh produce.

In the liner material 10, the thermoplastic film layer(s) 16 provides a protective barrier to water and dirt or other materials or influences which might shorten the shelf life of the packaged produce or otherwise interfere with the function of the package, or which would diminish the appeal of the produce to the consumer. The adhesive layer 12 provides a means to join this protective barrier to the substrate 18, and by virtue of the open cell foamed nature of the adhesive layer 12, allows for some controlled movement of gaseous materials across the material 20 and a package wall formed thereof.

In this regard, it is known that controlled atmosphere packaging can retard the further ripening and decay of ripe produce by controlling the ingress and egress of biologically significant gases such as oxygen and carbon dioxide with respect to a package containing the produce. For the present invention it will be appreciated that such control is particularly desirable at the lower temperatures prevailing in the long-distance refrigerated shipping of the produce from regional and national sources (normally from about 0° C. to about 10° C.). In this way, both refrigeration and controlled atmosphere packaging can be used to retard decay and further ripening of the produce.

For a cardboard substrate 18, however, none of the materials known to adhere adequately to the substrate 18 are additionally sufficiently gas-permeable in a conventional solid film to function with layers 16 and the substrate 18 as a controlled atmosphere packaging material in the range of about 0° C. to about 10° C.

By using an open cell foamed adhesive layer 12 rather than a solid adhesive layer, the liner material 10 of the present invention generally makes possible a range of gas permeabilities for the material 20, using those adhesives which adhere to cardboard, which correspond to use of the material 20 for controlled atmosphere packaging at refrigeration conditions.

As is well known in the controlled atmosphere packaging art, spoilage of particular types of produce is best retarded by achieving a particular equilibrium concentration of oxygen and carbon dioxide in the atmosphere surrounding the produce. These concentrations can vary significantly from one type of produce to another. For example, broccoli is generally shipped best at a concentration of from 5 to 10% by volume of carbon dioxide, mushrooms do best at from 10 to 15%, sweet corn at 10 to 20%, and apples at 1 to 2%. Most preferably the packaging material 20 for a particular package will be designed to achieve an optimum concentration of oxygen and of carbon dioxide for the produce to be shipped therein.

The actual design of a particular packaging material 20 will be dependent on a number of factors, such as the type or types of produce to be packaged therein, the anticipated area of liner material 10 to be used in lining a particular package design, and the amount of produce to be placed in the package.

A detailed explanation of an embodiment most appropriately suited for each combination of these factors is consequently not possible, but it is considered that the permeabilities to oxygen and carbon dioxide which are necessary to achieve the optimum equilibrium concentrations can be achieved in a given application without undue experimentation, given the guidance and examples provided herein.

For example, in the usual case where the type and amount of produce are known along with the area available to be lined in a given package, one would ordinarily then determine from published data the respiratory behavior, equilibrium concentrations of biologically significant gases, amd refrigeration temperatures most appropriate to minimizing spoilage of that produce. The foregoing information will readily indicate the overall permeabilities required of the packaging material 20 as a whole at the appropriate refrigeration conditions to achieve these equilibrium gas concentrations.

The packaging material 20 is then preferably constructed to possess these permeabilities simply by selecting a particular adhesive for the adhesive layer 12, and opening up or closing the cells of the foamed adhesive layer 12 until the appropriate permeabilities are achieved.

A most preferred embodiment of the packaging material 20 which should meet the needs of most applications consists essentially of a liner material 10 and a cardboard substrate 18. The liner material 10 in the most preferred embodiment provides a protective barrier to water and dirt through a layer 16 of one or more of the homopolymers and copolymers of ethylene, styrene, and propylene (especially polystyrene or polyethylene), and enables an equilibrium concentration in the atmosphere of the package of from about 2 to about 8 percent by volume of oxygen (at refrigeration conditions), and a carbon dioxide content of from 0 to about 20 percent by volume.

It is believed that the specified equilibrium concentrations of oxygen and carbon dioxide will, in combination with refrigeration at from about 5 to about 10° C., be broadly effective in retarding the spoilage of most fresh produce and for preventing bacterial growth (through the carbon dioxide), and that in most circumstances a barrier to water and dirt will be all that is required of the layer 16. It should be observed at the same time, though, that the layer 16 could be selected on the basis of its permeability for certain gases, thus providing some additional measure of control over the ingress and egress of the biologically-significant gases, or on the basis of other desired properties such as abrasion or chemical resistance.

The adhesive layer 12 in the most preferred embodiment preferably comprises one or more ethylene acrylic acid copolymer (EAA) adhesives such as the commercially available Primacor TM adhesive resins produced and sold by the assignee of the present invention. Suitable ethylene acrylic acid adhesives can contain as little as about 3 percent of acrylic acid and can have a melt index ranging from 2.0 to 300, with a preferred EAA adhesive containing about 6.5 percent of acrylic acid and having a melt index of about 2.0. Other copolymers of olefins with alpha-beta monoethylenically unsaturated monomers, such as those described in U.S. Pat. No. 4,871,406 to Griffith, are also considered useful in the adhesive layer 12. Most preferably, the adhesive layer 12 consists substantially entirely of one or more of the ethylene acrylic acid adhesives.

The adhesive layer 12 will generally constitute no more than about 50 percent of the thickness of the liner material 10 and will preferably comprise from about 10 to about 40 percent of the thickness of the liner material 10 in an unfoamed state. A blowing agent is selected to produce a foamed adhesive layer 12 having an average net cell area of from about 0.10 to about 14.0 $mm^2$, although preferably the average net cell area of the adhesive layer 12 will be tailored to the produce to be packaged in the packaging material 20. In this regard it appears that the permeability of a liner material 10 having a particular structure may bear a generally linear relationship to the average net cell area of the adhesive layer 12, so that by routine experimentation with a given liner material 10 the appropriate net cell area should be ascertainable.

The average net cell area of an adhesive layer 12 is determined by measuring the dimensions of 10 randomly selected cells in the machine direction of the layer 12 and in the transverse direction with an optical magnifier having appropriate scale gradations for measuring the size of the cells. These dimensions in the machine direction are averaged, as are those in the transverse direction. The average net cell area is determined according to the equation $A=(\pi/4)(MD)(TD)$, where A is the average net cell area of the layer 12, MD is the average dimension of the cells in the machine direction of the layer 12, and TD is the average dimension of the cells in the transverse dimension.

The packaging material 20 shown in FIG. 2 is preferably produced by coextruding the adhesive layer 12 and the layer 16 in a conventional blown or cast film process to form the liner material 10, with a physical or chemical blowing agent having been incorporated into the material for the adhesive layer before coextrusion with the layer 16.

The foamed adhesive layer 12 can generally be either the inner or outer layer in a blown film process, one effect of foaming being generally to reduce the tack of an adhesive layer 12 compared to a solid adhesive film layer.

The resulting liner material 10 is thereafter joined to the substrate 18 by any conventional means for accomplishing this end without the use of spray or other types of adhesives, such as by compression molding, hot roll lamination, or by vacuum forming the film to the cardboard. Another suitable method would employ the latent heat of corrugation of the cardboard for the purpose of laminating the liner 10 to the cardboard substrate 20, as described more fully in U.S. Pat. No. 4,871,706 to Griffith.

ILLUSTRATIVE EXAMPLES

These Examples are intended to be merely illustrative of the present invention, and should therefore not be construed as implying any limitations with respect to the scope of the present invention, as defined by the claims following thereafter.

COMPARATIVE EXAMPLE 1

This Example provides a comparison of the oxygen and carbon dioxide permeabilities of two-layered liner materials for various combinations of materials. One liner material having a conventional solid adhesive layer was prepared from each combination of materials. A second liner material having an open cell foamed adhesive layer of the type described herein was prepared also from each combination of materials.

Each of the liner materials for a given combination were prepared by a blown film process in the same way and under the same conditions, except for the incorporation in the liner material with the open cell foamed adhesive layer of an azodicarbonamide or a sodium bicarbonate-citric acid based blowing agent concentrate. For each combination an amount of blowing agent concentrate sufficient to achieve a net cell area on average in the open cell foamed adhesive layer of from about 0.10 to about 14.0 mm$^2$ was employed.

The permeabilities of the liner materials were determined by a Permatran Multi-Tran TM 4000 permeation tester with respect to both oxygen and carbon dioxide, according to ASTM F1249-89. The liner materials were tested at 23° C.

Results of the testing are reported in Table 1 below, where combination A employed a blend of 75 percent by weight of an aliphatic polyether polyurethane (80 Shore A hardness) with 25 percent by weight of Plexar TM 3342 maleic anhydride-modified ethylene-vinyl acetate copolymer adhesive (2.0 melt index, Quantum Chemical) in the thermoplastic film layer, and Bynel TM CXA 3101 maleic anhydride-modified ethylene-vinyl acetate adhesive (3.5 melt index, E.I. DuPont de Nemours & Co., Inc.) in the adhesive layer. In an unfoamed state, the adhesive layer was 35 percent of the thickness of the liner, while the foamed adhesive layer amounted to 47 percent of the liner.

Combination B used Pellethane TM 2103-90A aromatic ether polyurethane (90 Shore A hardness, The Dow Chemical Company) in its thermoplastic film layer, and the Plexar TM 3342 adhesive in its adhesive layer. The adhesive layer in liner combination B was 34 percent of the layer thickness in in an unfoamed state; its thickness after being foamed was not measured.

In combination C, the thermoplastic film layer was comprised of a blend of 75 percent by weight of the Pellethane TM 2103-90A aromatic ether polyurethane and 25 percent of the Bynel TM CXA 3101 maleic anhydride-modified ethylene-vinyl acetate copolymer adhesive, while the adhesive layer was made from the Plexar TM 3342 copolymer adhesive. The adhesive layer in combination C was 35 percent of the thickness of the liner material in an unfoamed condition, and 55 percent in a foamed condition.

TABLE 1

| Combination | Adhesive Layer | Overall Thickness (mils) | Permeability (cm$^3$ 100 in$^2$ × atm × day) (23° C.) | | Average Cell Size (mm) | | Average Cell Area (mm$^2$) |
|---|---|---|---|---|---|---|---|
| | | | Oxygen | Carbon Dioxide | MD | TD | |
| A | Solid | 3.0 | 370 | 3465 | — | — | — |
| | Foamed | 3.75 | 493 | 3398 | 0.9 | 0.4 | 0.28 |
| B | Solid | 2.8 | 109 | 870 | — | — | — |
| | Foamed | approx. 4 | 245 | 1568 | n.a.$^{(a)}$ | n.a.$^{(a)}$ | — |
| C | Solid | 2.65 | 149 | 1674 | — | — | — |
| | Foamed | 4.25 | 176 | 1524 | 0.9 | 0.6 | 0.42 |

$^{(a)}$no measurement taken;

COMPARATIVE EXAMPLE 2

This Example further compares the permeabilities to carbon dioxide and oxygen of two-layer liner materials with foamed and unfoamed adhesive layers at different temperatures and with several material combinations, the liner materials of this Example also being prepared by a different process than employed in Comparative Example 1.

Each pair of liner materials for a given combination of materials in the present Example were formed identically via a cast film process, the only difference being the incorporation in the adhesive layer of one of the two liner materials of a blowing agent concentrate of 20 percent azodicarbonamide in ethylene-vinyl acetate. The blowing agent concentrate was employed in each instance where a foamed adhesive layer was to be formed in an amount sufficient to produce an open cell foamed adhesive layer with an average net cell area of from about 0.10 to about 14.0 mm$^2$.

Combinations D and E of the present example each used a low density polyethylene with a melt index of 1.0 and a density of 0.922 grams per cubic centimeter for the thermoplastic film layer in their liners. Combination D used Primacor TM 1430 ethylene-acrylic acid copolymer adhesive (9 percent acrylic acid, 2.0 melt index, The Dow Chemical Company) for the adhesive layer in its liners, while Combination E used Elvax TM 3190 ethylene-vinyl acetate copolymer adhesive (25 percent vinyl acetate, 2.0 melt index, E.I. DuPont de Nemours & Co., Inc.) for the adhesive layer in its liner materials.

Permeability testing was conducted as in Comparative Example 1 generally, except that the tests were conducted at 30 and 50° C. instead of 23° C. The results are reported in Table 2.

TABLE 2

| Combination | Adhesive Layer | Overall Thickness (mils) | Average Cell Sizes (mm) | | Avg. Cell Area (mm$^2$) | Permeability (Cm$^3$/100 in$^2$ · atm · day) | |
|---|---|---|---|---|---|---|---|
| | | | MD | TD | | Oxygen 50° C./30° C. | Carbon Dioxide 50° C./30° C. |
| D | Solid | 2.85 | — | — | — | 250/190 | 1640/870 |

TABLE 2-continued

| Combination | Adhesive Layer | Overall Thickness (mils) | Average Cell Sizes (mm) MD | TD | Avg. Cell Area (mm$^2$) | Permeability (Cm$^3$/100 in$^2$ · atm · day) Oxygen 50° C./30° C. | Carbon Dioxide 50° C./30° C. |
| --- | --- | --- | --- | --- | --- | --- | --- |
| E | Foamed | 4.5 | 3.9 | 0.7 | 2.14 | 610/233 | 2460/1130 |
|   | Solid | 3.2 | — | — | — | 510/210 | 2480/1300 |
|   | Foamed | 5.5 | n.a.$^{(a)}$ | n.a.$^{(a)}$ | n.a.$^{(a)}$ | 530/290 | 2730/1420 |

$^{(a)}$not measured;

The permeabilities of a proposed liner material to oxygen and CO$_2$ at these different temperatures can be used to estimate the permeabilities to oxygen and CO$_2$ of the liner material at the proper or desired refrigeration temperatures for a particular type of produce This estimation is done by a well-known technique, extrapolating the measured permeabilities on a semi-logarithmic plot of permeability versus the reciprocal of the temperature in degrees Kelvin to the desired refrigeration temperatures. The permeabilities can then be compared to those determined by a knowledge of the respiratory behavior, etc. to be required for achieving particular equilibrium concentrations of the biologically significant gases in a given application and for a given type of produce, as indicated above.

COMPARATIVE EXAMPLE 3

This Example compares the permeabilities (at 23° C.) to carbon dioxide and oxygen of additional liner materials with foamed and unfoamed adhesive layers, and with different blowing agent concentrates and types. The liner materials for this Example were prepared by a blown film process as in Comparative Example 1. Permeability testing and measurement of the average cell sizes and areas were done in the same manner as Comparative Examples 1 and 2.

The liner materials of Set F of this Example used a thermoplastic film layer of Attane TM 4003 ultra low linear low density ethylene-octene copolymer, with a melt index of 0.8 and a density of 0.905 grams/cc (The Dow Chemical Company). The adhesive layers were Primacor TM 3330 ethylene-acrylic acid copolymer adhesive (6.5 percent acrylic acid, 2.0 melt index, The Dow Chemical Company). The blowing agent used was Spectratech TM FM 1764 sodium bicarbonate/citric acid-based concentrate (about 5 percent each of sodium bicarbonate and citric acid in low density polyethylene, Quantum Chemical), and the blowing agent was used at a 4 phr level in the adhesive layer of each of the two liner materials having a foamed adhesive layer. In an unfoamed state the thermoplastic film layer was 60 percent of the thickness of the liner material, and in the liner materials with the foamed adhesive layers was 43 percent of the total thickness of the liner materials.

The liner materials of Set G used the same materials for the thermoplastic film and adhesive layers as used in Set F, but employed Spectratech TM FM 1054S azodicarbonamide-based blowing agent concentrate (20 percent azodicarbonamide in ethylene-vinyl acetate copolymer, Quantum Chemical) in the two liner materials having foamed adhesive layers. In each of these two liner materials the blowing agent concentrate was used at a 5 phr level. In the liner material having the unfoamed/solid adhesive layer the thermoplastic film layer was 66 percent of the total thickness of the liner, whereas in the two liner materials having foamed adhesive layers the thermoplastic film layer constituted 20 and 17 percent of the total thickness of the respective liner material.

The results of the testing and measurements on the liner materials in Sets F and G are provided below in Table 3.

TABLE 3

| Set | Adhesive Layer | Overall Thickness (mils) | Average cell size (mm) MD | TD | Avg. Cell Area (mm$^2$) | Permeability (units) (cm$^3$ 100 in$^2$ × atm × day) (23° C.) Oxygen | Carbon Dioxide |
| --- | --- | --- | --- | --- | --- | --- | --- |
| F | Solid | 1.9 | — | — | — | 360 | 1550 |
|   | Foamed | 2.5 | 1.1 | 0.15 | 0.13 | 470 | 1970 |
|   | Foamed$^{(a)}$ | 2.8 | 0.9 | 0.20 | 0.14 | 490 | 1890 |
| G | Solid | 1.9 | — | — | — | 390 | 1550 |
|   | Foamed | 5.0 | 7.5 | 1.1 | 6.5 | 560 | 2420 |
|   | Foamed$^{(b)}$ | 5.8 | 8.9 | 1.6 | 11.2 | 680 | 2710 |

$^{(a)}$Extrusion temp. 20 deg. F. higher than other liner of Set F with foamed adhesive layer;
$^{(b)}$Layer thicknesses adjusted by resetting extruder rpm for thermoplastic film layer;

These Examples demonstrate that significant increases in the permeability of coextruded films with an adhesive layer and a thermoplastic layer can result from an open cell foamed construction of the adhesive layer, as compared to a conventional solid construction. The increases are more pronounced with those adhesives which are more highly impermeable to biologically significant gases such as oxygen and carbon dioxide as conventional solid films.

While a number of embodiments of the present invention are described and exemplified herein, a number of other useful modifications, derivations and extensions of such embodiments and uses are possible which are within the spirit and scope of the present invention, and which are intended to be encompassed within the following claims.

What is claimed is:

1. A packaging material useful for the controlled atmosphere packaging in bulk of ripened produce, consisting essentially of a liner material and a supporting cardboard substrate, wherein the liner material consists of an open cell foamed adhesive layer of one or more ethylene acrylic acid copolymer adhesives and a substantially solid thermoplastic film layer of polyethylene or polystyrene in face to face relationship.

2. A package formed form the packaging material of claim 1.

3. A package as defined in claim 13 which, when filled with ripened produce at refrigeration conditions, produces an atmosphere possessing an equilibrium concentration of from about 2 to about 8 percent by volume of oxygen, with from about 0 to about 20 percent by volume of carbon dioxide.

* * * * *